United States Patent
Hao et al.

(10) Patent No.: US 10,544,772 B2
(45) Date of Patent: Jan. 28, 2020

(54) BUS VOLTAGE STABILIZATION IN POWERTRAIN HAVING ELECTRIC STARTER SYSTEM WITH POLYPHASE BRUSHLESS STARTER MOTOR

(71) Applicant: GM Global Technology Operations LLC, Detroit, MI (US)

(72) Inventors: Lei Hao, Troy, MI (US); Chandra S. Namuduri, Troy, MI (US); Suresh Gopalakrishnan, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 108 days.

(21) Appl. No.: 15/961,128

(22) Filed: Apr. 24, 2018

(65) Prior Publication Data
US 2019/0323472 A1 Oct. 24, 2019

(51) Int. Cl.
*F02N 11/08* (2006.01)
*H02P 6/08* (2016.01)

(52) U.S. Cl.
CPC ........... *F02N 11/0851* (2013.01); *H02P 6/08* (2013.01); *F02N 2011/0896* (2013.01);
(Continued)

(58) Field of Classification Search
CPC ........ F02N 11/0851; F02N 2011/0896; F02N 2200/041; F02N 2200/042;
(Continued)

(56) References Cited

U.S. PATENT DOCUMENTS

| 6,590,360 B2 * | 7/2003 | Hirata | B60K 6/485 318/151 |
| 2012/0025601 A1 | 2/2012 | Nefcy et al. | |
| 2014/0375243 A1 * | 12/2014 | Kira | H02P 29/026 318/566 |

FOREIGN PATENT DOCUMENTS

| CN | 2711983 Y | 7/2005 |
| EP | 0619427 B1 | 10/1994 |

(Continued)

OTHER PUBLICATIONS

Bchaier, EP 3361623, machine translation (Year: 2018).*
(Continued)

*Primary Examiner* — Hung Q Nguyen
*Assistant Examiner* — Mark L. Greene
(74) *Attorney, Agent, or Firm* — Quinn IP Law

(57) ABSTRACT

An electric starter system is usable with an engine and a power inverter module (PIM), e.g., of a powertrain. The starter system includes a poly phase/AC brushless starter motor connected to the PIM via an AC voltage bus and selectively connected to the engine during a requested engine start event. A sensor on the DC voltage bus outputs a signal indicative of a voltage level of the DC voltage bus. The controller executes a method using voltage stabilization logic having a proportional-integral (PI) torque control loop. Logic execution in response to the requested engine starting event causes the controller to control the starter motor, when the bus voltage exceeds a calibrated minimum voltage, using a starting torque determined via the control loop. The commanded starting torque limits inrush current to the starter motor such that the DC voltage bus remains above the minimum voltage.

18 Claims, 2 Drawing Sheets

(52) U.S. Cl.
CPC .. *F02N 2200/042* (2013.01); *F02N 2200/043* (2013.01); *F02N 2200/044* (2013.01); *F02N 2250/02* (2013.01); *F02N 2300/102* (2013.01); *F02N 2300/104* (2013.01); *F02N 2300/2008* (2013.01)

(58) Field of Classification Search
CPC ......... F02N 2200/043; F02N 2200/044; F02N 2200/047; F02N 2250/02; F02N 2300/102; F02N 2300/104; F02N 2300/2008; F16F 15/30; H02P 6/08
See application file for complete search history.

(56) References Cited

FOREIGN PATENT DOCUMENTS

| | | | |
|---|---|---|---|
| EP | 3361623 A1 * | 8/2018 | ................ H02P 6/08 |
| JP | 2000104650 A | 4/2000 | |

OTHER PUBLICATIONS

Quanbao Zhou, John Houldcroft, "Cold engine cranking torque requirement analysis," SAE International Inc., 2007, JSAE 20077002.
Hao et al, Utility U.S. Appl. No. 15/961,094, filed Apr. 23, 2018.
Namuduri et al, Utility U.S. Appl. No. 15/967,918, filed May 1, 2018.
Namuduri et al, Utility U.S. Appl. No. 15/967,915, filed May 1, 2018.
Hao et al, Utility U.S. Appl. No. 15/967,910, filed May 1, 2018.

* cited by examiner

BUS VOLTAGE STABILIZATION IN POWERTRAIN HAVING ELECTRIC STARTER SYSTEM WITH POLYPHASE BRUSHLESS STARTER MOTOR

INTRODUCTION

A powertrain may include an internal combustion engine that generates engine torque in response to an acceleration request. The generated engine torque may be transmitted to a coupled load via a transmission, e.g., a planetary gear arrangement or a gearbox. In some powertrain configurations, a rotor of an electric machine is selectively coupled to the engine, with motor torque from the electric machine used to accelerate the engine to a threshold speed. Torque assist from the electric machine may be limited to supporting the engine's cranking and starting function, e.g., during an engine auto-start event, with the electric machine in such an application referred to as a starter motor.

SUMMARY

An electric starter system is disclosed herein for use with a powertrain or other system having an internal combustion engine, a direct current (DC) voltage bus, an alternating current (AC) voltage bus, and a power inverter module (PIM) electrically connected to and between the DC and AC voltage busses. The electric starter system includes a polyphase/AC brushless starter motor that is electrically connected to the AC voltage bus. The brushless starter motor is selectively connectable to the engine in response to a requested engine start event. As part of the electric starter system, an electrical sensor connected to the DC voltage bus outputs a signal indicative of a voltage level of the DC voltage bus.

A controller is in communication with the electrical sensor within the above-noted electric starter system. The controller is programmed with voltage stabilization logic that includes a proportional-integral (PI) torque control loop. Execution of the voltage stabilization logic in response to the requested engine start event, specifically when the voltage level of the DC voltage bus is less than a calibrated minimum voltage, causes the controller to determine a starting torque of the brushless starter motor using the PI torque control loop. The controller also transmits a torque command to the brushless starter motor to cause the brushless starter motor to transmit the required starting torque to the engine. As described herein, the required starting torque has a value that limits an inrush current to the brushless starter motor such that the voltage level of the DC voltage bus remains above the calibrated minimum voltage.

Absent the improvements disclosed herein, the starter motor may draw a high inrush current during an engine start event in which motor torque from the starter motor is harnessed and used to crank and start the engine. The inrush current may result in an undesirable voltage drop on the DC voltage bus, a condition referred to as "voltage sag" in the art. For instance, in a system drawing 1000 amps (A), an engine start event may result in an inrush current of about 900 A over 500-600 milliseconds (ms), with a corresponding DC voltage sag of about 5 volts (V) from a nominal 12-15V auxiliary level. Such pronounced voltage sag may manifest itself as lamp flicker or various reset actions for auxiliary voltage-driven control units or other auxiliary components within a vehicle, power plant, or other system using the disclosed powertrain.

The controller is therefore configured to use feedback control, specifically the PI torque control loop, in which a measured bus voltage is used as a feedback variable. The controller performs the described voltage stabilization function by actively controlling the DC bus voltage via limitation of a maximum output power of the starter motor. In this manner, the controller is able to maintain the DC voltage bus at or above the calibrated threshold voltage, e.g., 8.5V.

The starter motor may include a rotor and the engine may include a flywheel. In such an embodiment, the electric starter system may include a solenoid and a pinion gear, with the solenoid connected to the rotor and the pinion gear connected to the solenoid. The solenoid is configured to translate the pinion gear into meshed engagement with the flywheel in response to the requested engine start event.

A maximum voltage level of the DC voltage bus may be 13V, with the calibrated minimum voltage being between 8V and 9V in this example embodiment. The controller in the example 13V maximum voltage embodiment may limit a current level of the DC voltage bus to about 500 A such that the bus voltage is maintained above the calibrated minimum voltage.

The controller may be configured to generate or command pulse width modulation of the PIM and the starter motor to achieve the adjusted requested torque.

The controller, according to a possible approach, uses a pair of torque-speed models for the AC brushless starter motor and a reference/hypothetical brush-type starter motor. The torque-speed models receive a present speed of the brushless starter motor and output a corresponding maximum torque capability for the brushless starter motor and the reference/hypothetical brush-type starter motor. A torque limiter block of the logic limits the torque command between the maximum torque capacity of the brushless starter motor and the brush-type starter motor.

A method is also disclosed herein for stabilizing the bus voltage on the above-noted DC voltage bus. The method includes determining the voltage level of the DC voltage bus using an electrical sensor, and thereafter comparing the voltage level to a calibrated minimum voltage using the controller. The method further includes, responsive to the measured voltage level being less than the calibrated minimum voltage, determining, using the PI torque control loop, a motor torque of the starter motor, and also transmitting the motor torque to the starter motor as a commanded starting torque to thereby crank and start the engine. The commanded starting torque has a value that limits inrush current to the starter motor during the starting event, such that the voltage level of the DC voltage bus remains above the calibrated minimum voltage.

A powertrain is also disclosed herein that, according to an example embodiment, includes the engine, DC and AC voltage busses, PIM, polyphase/AC brushless starter motor, electrical sensor, and controller noted above.

The powertrain may include a transmission coupled to the engine, with a drive axle coupled to the transmission, and having a load coupled to the drive axle. Torque from the engine is transferred to the load through the transmission and drive axle in such an embodiment. The load may be optionally embodied as drive wheels of a motor vehicle.

The above summary is not intended to represent every embodiment or aspect of the present disclosure. Rather, the foregoing summary exemplifies certain novel aspects and features as set forth herein. The above noted and other features and advantages of the present disclosure will be readily apparent from the following detailed description of representative embodiments and modes for carrying out the present disclosure when taken in connection with the accompanying drawings and the appended claims.

Figure 1:
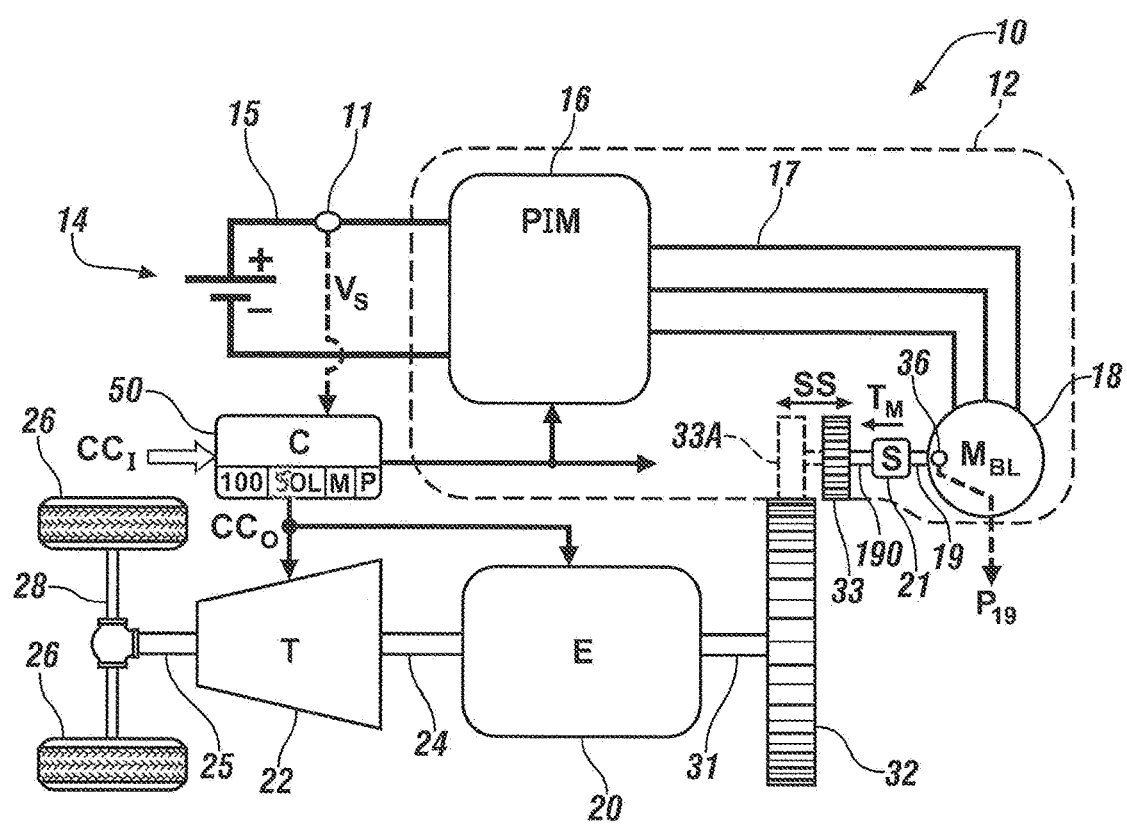
FIG. 1 is a schematic illustration of an example powertrain having a polyphase/alternating current (AC) brushless starter motor and a direct current (DC) voltage bus whose voltage level is measured and actively stabilized via a torque feedback loop using the control method described herein.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

Embodiments of the present disclosure are described herein. The various embodiments are examples of the present disclosure, with other embodiments in alternative forms being conceivable by one of ordinary skill in the art in view of the disclosure. The figures are not necessarily to scale. Some features may be exaggerated or minimized to show details of particular components. Therefore, specific structural and functional details disclosed herein are not to be interpreted as limiting, but rather as a representative basis for teaching one skilled in the art to variously employ the present disclosure. As those of ordinary skill in the art will also understand, features illustrated and described with reference to a given one of the figures may be combinable with features illustrated in one or more other figures in order to produce embodiments that are not explicitly illustrated or described. The combinations of features illustrated thus serve as representative embodiments for typical applications. Various combinations and modifications of the features consistent with the teachings of this disclosure, however, could be desired for particular applications or implementations.

Referring to the drawings, wherein like reference numbers refer to the same or like components in the several Figures, a powertrain 10 is shown schematically in FIG. 1. The powertrain 10 includes an electric starter system 12 coupled to an internal combustion engine (E) 20 and including and/or controlled via a controller (C) 50. As noted above, the controller 50 is configured to execute a voltage stabilization method 100 in the overall control of a torque operation of a polyphase/alternating current (AC) brushless electric machine, hereinafter referred to as starter motor ($M_{BL}$) 18. Thus, torque feedback control of the starter motor 18 is performed by the controller 50 so as to regulate the voltage level of a DC voltage bus 15 as set forth below.

The engine 20, e.g., a gasoline or diesel engine, ultimately outputs engine torque to an output shaft 24. The output shaft 24 is coupled to a transmission (T) 22, e.g., via a hydrodynamic torque converter or clutch (not shown). The transmission 22 ultimately delivers output torque at a particular gear or speed ratio to a transmission output member 25. The output member 25 in turn drives a coupled load via one or more drive axles 28, with the load depicted in FIG. 1 as a set of drive wheels 26 in an example automotive application. Other beneficial applications for the powertrain 10 may be envisioned, including power plants, robotics, mobile platforms, and non-motor vehicle applications such as watercraft, marine vessels, rail vehicles, and aircraft, and therefore the motor vehicle embodiment of FIG. 1 is intended to be illustrative of the disclosed concepts without limitation.

The engine 20 includes a crankshaft 31 coupled to a flywheel 32. When the engine 20 is not running, such as after a fuel-conserving auto-stop event of the engine 20 at idle or when cruising with the engine 20 turned off, the electric starter system 12 may be electrically energized in response to starter control signals (arrow $CC_S$) from the controller 50 so as to selectively deliver a motor torque (arrow $T_M$) to the flywheel 32. One possible configuration for achieving such ends is the use of a solenoid (S) 21. The solenoid 21 may be disposed between a rotor 19 of the starter motor 18 and a shaft extension 190, possibly with a gear reduction set (not shown) located between the rotor 19 and the solenoid 21. A position sensor 36 of the starter motor 18, e.g., a Hall-effect sensor, multiplying rotary encoder, inductive sensor, or reluctance sensor, may be used to measure and output an angular position (arrow $P_{19}$) of the rotor 19, which the controller 50 may use to determine position and speed of the rotor 19 within the scope of the method 100 described below.

In a possible embodiment, when the solenoid 21 is energized in response to the starter control signals (arrow $CC_S$), the solenoid 21 linearly translates a pinion gear 33 to the position indicated at 33A, and thus into direct meshed engagement with mating teeth or splines on the flywheel 32 and/or a gear element connected thereto. Once the engine 20 has started and runs at a speed sufficient to sustain its fueling and internal combustion process, the starter control signals (arrow $CC_S$) are discontinued. As a result, the solenoid 21 is de-energized. The pinion gear 33 is then urged out of engagement with the flywheel 32, e.g., via a return action of the solenoid 21. Such bi-directional translation capability of the pinion gear 33 is represented in FIG. 1 by double-headed arrow SS.

The example electric starter system 12 of FIG. 1 may include or may be connected to a direct current (DC) battery pack 14, e.g., a multi-cell lithium ion, nickel metal hydride, or lead acid battery pack having positive (+) and negative (−) terminals. The electric starter system 12 may include a power inverter module (PIM) 16 that is electrically connected across the positive (+) and negative (−) terminals of the battery pack 14 via the DC voltage bus 15, e.g., a 12-48 VDC bus in a possible embodiment, as well as to a polyphase/alternating current (AC) voltage bus 17. Although omitted from FIG. 1 for illustrative simplicity, the PIM 16 includes semiconductor switching pairs, e.g., MOSFETs, which are connected to positive (+) and negative (−) terminals via the DC voltage bus 15, and signal filtering circuit components which ultimately convert DC power from the battery pack 14 into polyphase power on the AC voltage bus 17.

In turn, the AC voltage bus 17 is electrically connected to individual phase windings internal to the starter motor 18. The starter motor 18 may be configured such that a calibrated back electromotive force (BEMF) results for a given performance range, e.g., 3-5V at 6000 RPM, or other values ensuring that sufficient motor torque (arrow $T_M$) is available for starting the engine 20, e.g., 5-7 Nm within parameters of the DC voltage bus 15, e.g., no less than a nominal 9V operation in the example 8.5V threshold used below. The starter motor 18 may be variously configured as a surface permanent magnet machine, an internal permanent magnet machine, a drag-cup induction machine, a switched reluctance machine, or another type of brushless motor without limitation. As recognized herein, brushless motors such as the starter motor 18 may enjoy an extended operating life with an improved level of speed control precision relative to certain brush-type motors, among other possible benefits.

The controller 50 of FIG. 1 is configured to stabilize and maintain at least a minimum DC voltage level on the DC voltage bus 15, e.g., 8-9V, and therefore requires accurate voltage data to ensure responsive torque control of the starter motor 18 during an automatic starting function of the engine 20. At least one electrical sensor 11 is positioned on the DC voltage bus 15. The electrical sensor 11 may be configured as a single-wire or multi-wire DC voltage sensor having an electrically-isolated input and digital output. Alternatively, the electrical sensor 11 may be a current sensor, with the controller 50 calculating the DC bus voltage using the measured current. The measured voltage, current, and/or other suitable electrical value is used as part of a set of input signals (arrow CO to the controller 50.

The controller 50 may be variously implemented as one or more control devices collectively managing the motor torque (arrow $T_M$) from the starter motor 18 within the example electric starter system 12, with the controller 50 performing this task using voltage stabilization logic 50L according to a method 100. Multiple controllers may be in communication via a serial bus, e.g., a Controller Area Network (CAN), or via discrete conductors. The controller 50 may include one or more digital computers each having a processor (P), e.g., a microprocessor or central processing unit, as well as memory (M) in the form of read only memory, random access memory, electrically-programmable read only memory, etc., a high-speed clock, analog-to-digital and digital-to-analog circuitry, input/output circuitry and devices, and appropriate signal conditioning and buffering circuitry. The controller 50 may also store algorithms and/or computer executable instructions in memory (M), including the underlying algorithms or code embodying the method 100 described below, and transmit commands to the electric starter system 12 to enable performance of certain control actions according to the present disclosure.

The controller 50 is in communication with the engine 20 and receives, as part of the input signals (arrow CO, signals indicative of a speed and temperature of the engine 20, as well as other possible engine operating conditions or parameters. Such parameters include a starting request of the engine 20, whether operator-initiated or autonomously generated. The controller 50 is also in communication with the starter motor 18, and thus receives signals indicative of current speed, current draw, torque, temperature, and/or other operating parameters. The controller 50 may also communicate with the battery pack 14 and receive signals indicative of a battery state of charge, temperature, and current draw, as well as a voltage across the respective DC and AC voltage buses 15 and 17. In addition to transmitting a torque request to the starter motor 18 via the starter control signals (arrow $CC_S$), the controller 50 may also transmit output signals (arrow $CC_O$) to the engine 20 and transmission 22 as part of the overall operating function of the controller 50.

Figure 2:
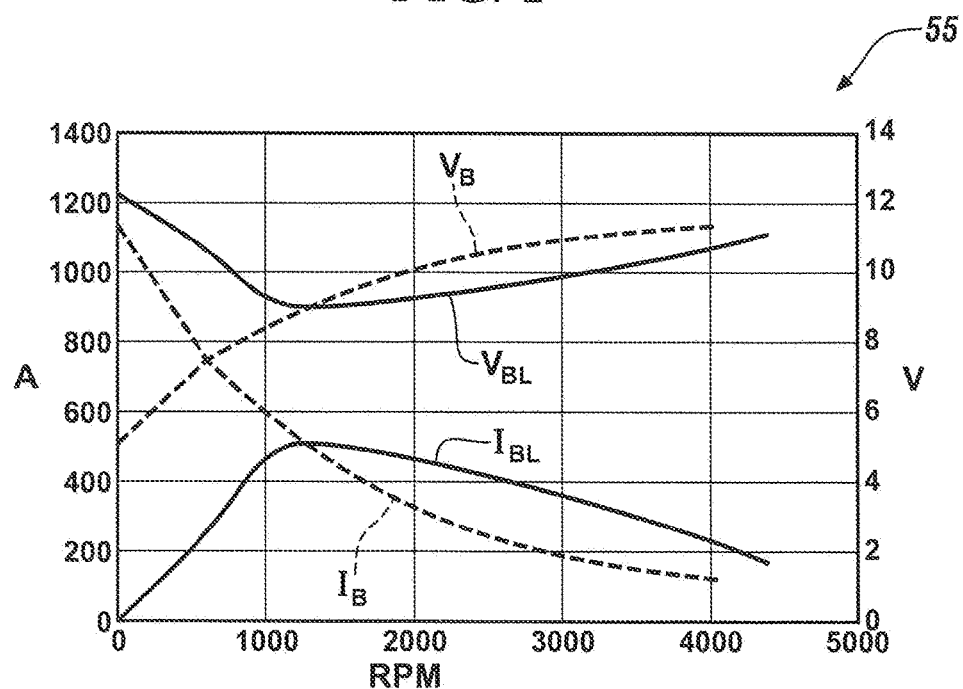
FIG. 2 is a plot of representative electrical and speed performance values of the DC voltage bus and brushless starter motor, respectively, with current and voltage draw depicted on the vertical axes and speed of the starter motor depicted on the horizontal axis.

Referring to FIG. 2, performance traces 55 illustrates inrush current and voltage sag during a starting event of the engine 20 of FIG. 1. The traces 55 include respective bus voltage and in-flow current traces $V_{BL}$ and $I_{BL}$ for the starter motor 18. Corresponding traces $V_B$ and $I_B$ describe the electrical performance of a similarly sized, hypothetical reference brush-type embodiment of the starter motor 18. As will be appreciated by one of ordinary skill in the art, the term "inrush current" refers to the maximal instantaneous surge current drawn by the starter motor 18 when the starter motor 18 is switched on during the starting event. For a brush-type starter, the full voltage level presently on the DC voltage bus 15 is typically applied to the machine's terminals, with current limited solely by machine resistance.

As machine resistance is low, almost 1000 A of current may be quickly drawn from the battery pack 14, which in turn leads to a drop or sag in bus voltage down to 5V at 0 RPM, as indicated by trace $V_B$. For the AC brushless starter motor 18, the controller 50 uses pulse width modulation (PWM) techniques, or other suitable switching control techniques, in order to regulate the bus voltage. Thus, the current supplied to the starter motor 18 may start at 0A and quickly increase as the starter motor 18 increases its speed. After the starter motor 18 reaches a particular threshold speed, e.g., 1500 RPM, the current indicated by trace $I_{BL}$ exceeds the magnitude of the corresponding current of trace $I_B$, i.e., the brushless starter motor 18 producing more power at higher speeds relative to a comparably-sized brush-type counterpart.

Figure 3:
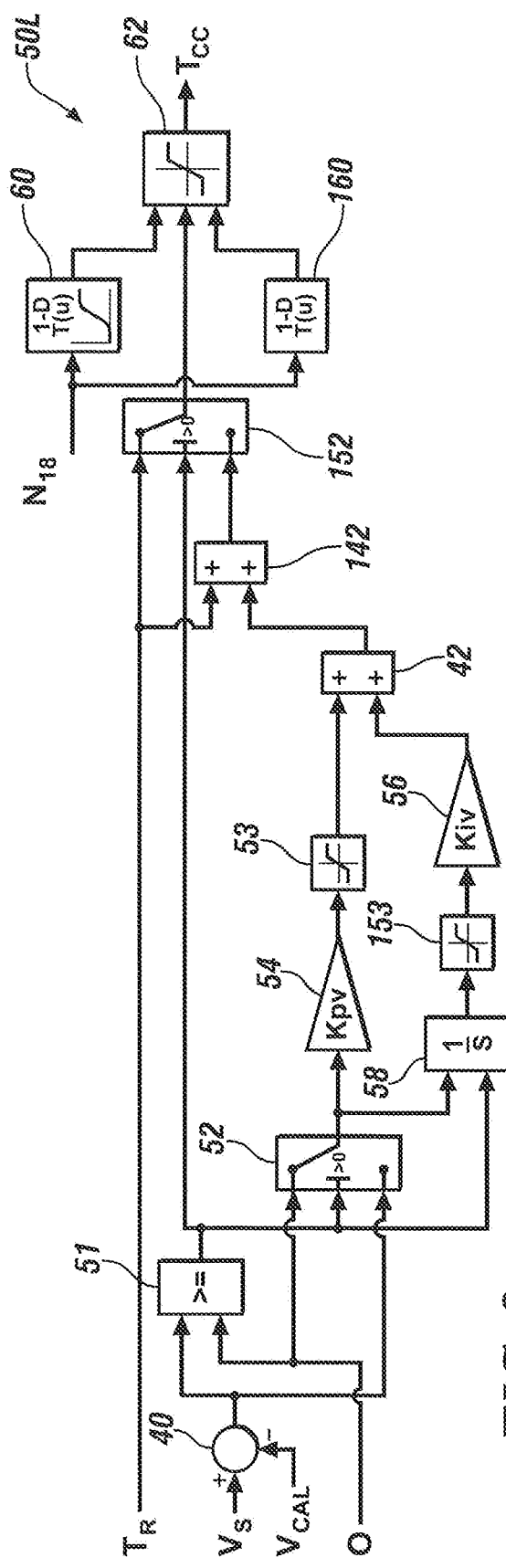
FIG. 3 is schematic logic flow diagram describing an implementation of the voltage stabilization method usable with the example powertrain of FIG. 1.

Voltage stabilization logic 50L as schematically depicted in FIG. 3 may be used by the controller 50 of FIG. 1 to implement the method 100. In general, the controller 50 uses the logic 50L to monitor the bus voltage on the DC voltage bus 15 of FIG. 1, with a measured bus voltage (arrow $V_S$) used as a feedback variable within a torque control loop outputting a torque command (arrow $T_{CC}$). The torque command (arrow $T_{CC}$) ultimately controls a torque operation of the starter motor 18, with the starter control signals (arrow $CC_S$) of FIG. 1 including the torque command (arrow $T_{CC}$). That is, the torque command (arrow $T_{CC}$) is an electrical control signal transmitted by the controller 50 of FIG. 1 to the starter motor 18, e.g., transmitted to a motor control processor (not shown) of the starter motor 18, and ultimately serving to generate a gate signal to the PIM 16 and/or other power inverter structure of the powertrain 10.

Inputs to the voltage stabilization logic 50L, which are part of the control inputs (arrow $CC_I$) of FIG. 1, include a required torque (arrow $T_R$), the measured bus voltage (arrow $V_S$) directly measured by or derived from measurements from the electrical sensor 11 of FIG. 1, a calibrated minimum voltage (arrow $V_{CAL}$), and a binary/bit value of zero (0). As used herein, the term "required torque" is a calibrated ideal torque value for the starter motor 18 under normal operating temperature and bus voltage conditions, e.g., about 80-100° C. and 12-15V, respectively. The calibrated minimum voltage (arrow $V_{CAL}$) is a predetermined value, e.g., 9V for a 12-15V auxiliary voltage level on DC voltage bus 15 of FIG. 1.

At a subtraction node 40, the calibrated minimum voltage (arrow $V_{CAL}$) is subtracted from the measured bus voltage (arrow $V_S$), with the difference fed into a relational operator block 51. Block 51 then compares the difference from node 40 to 0 and determines which value is greater. Thus, if the measured bus voltage (arrow $V_S$) is greater than the minimum voltage (arrow $V_{CAL}$), the torque command (arrow $T_{CC}$) passed to the starter motor 18 of FIG. 1 is the original/unadjusted value of the required torque (arrow $T_R$).

However, when the measured bus voltage (arrow $V_S$) is less than the minimum voltage (arrow $V_{CAL}$), the voltage stabilization logic 50L adjusts the required torque (arrow $T_R$) using proportional-integral (PI) control logic to ensure that a voltage level of the DC voltage bus 15 of FIG. 1 remains above the minimum voltage (arrow $V_{CAL}$). To this end, a logic switch 52 feeds zero (0) or the output of node 40 into an integrator block 58, which is labeled 1/S for clarity, and also into a proportional gain block 54 labeled "kpv". The proportional gain (P-term) from proportional gain block 54 and the integral term (I-term) from the integrator block 58 are fed into corresponding saturation blocks 53 and 153, each of which apply suitable upper and lower limits to the proportional and integral terms. The filtered/limited output of saturation block 153 is fed into an integral gain block 56 labeled "kiv" for added clarity. The output of the integral gain block 56 is then added at a first summation node 42 and fed into a second summation node 142.

Along with the output of the integral gain block 56, the second summation node 142 receives the requested torque (arrow $T_R$). The requested torque (arrow $T_R$) is adjusted upward at node 142 based on the output of the above-noted PI logic, i.e., blocks 42, 52, 53, 54, 56, and 153. Logic switch 152 outputs one of two values, i.e., the torque request (arrow $T_R$) or a PI-adjusted torque request (arrow $T_R^*$), with the output of logic switch 152 fed into a torque limiter block 62.

The voltage stabilization logic 50L further includes a pair of starter motor torque-speed models 60 and 160 for the starter motor 18 and the above-noted reference/hypothetical brush-type starter motor, respectively. Both starter motor models 60 and 160 receive the present speed (arrow $N_{18}$) of the starter motor 18, e.g., as reported by the position sensor 36 of FIG. 1 and/or calculated via the controller 50.

Figure 4:
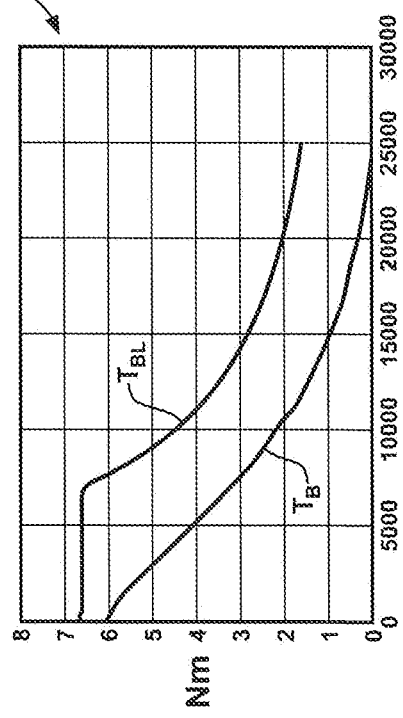
FIG. 4 is a torque-speed table usable by the voltage stabilization method of FIG. 3 and depicting representative torque and speed performance of the brushless starter motor and a reference brush-type starter motor, with torque depicted on the vertical axis and speed of the starter motor depicted on the horizontal axis.

Referring briefly to the set of performance traces 70 of FIG. 4, the torque-speed models 60 and 160 may be embodied as brushless and brush-type performance traces $T_{BL}$ and $T_B$, respectively. Trace $T_{BL}$ corresponds to torque capability of the starter motor 18. Trace $T_B$ corresponds to torque capability of the reference brush-type starter motor. In the example speed range of 0-1000 RPM, the torque capability of the starter motor 18 is maintained to a relatively higher speed than the reference brush-type starter, e.g., still remaining around 4.5 Nm at 1000 RPM. Responsive to the measured rotor speed (arrow $N_{18}$), the torque-speed models 60 and 160 output a corresponding torque capability, T(u), over a given duration (1-D) or corresponding speed range. Thus, the torque limiter block 62 serves to limit the torque value that is output by logic switch 152, and thus the torque command (arrow $T_{CC}$) ultimately generated by the voltage stabilization logic 50L, between a maximum torque capacity of the starter motor 18 and a maximum torque capacity of the reference brush-type starter motor.

Figure 5:
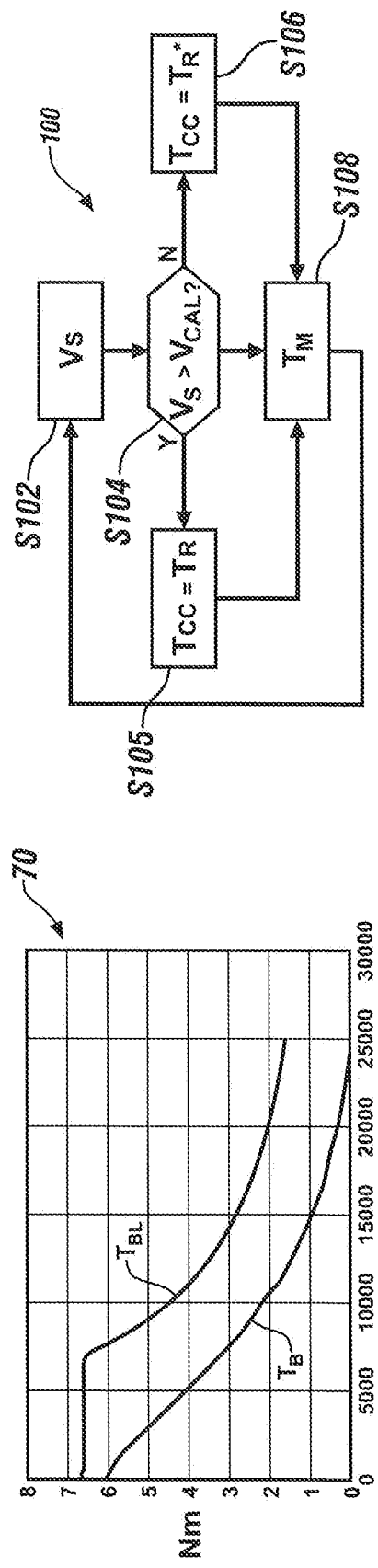
FIG. 5 is a flow chart describing an example embodiment of a method for stabilizing voltage on a DC voltage bus within the powertrain shown in FIG. 1.

FIG. 5 is an example embodiment of the method 100 for automatically stabilizing the bus voltage on the DC voltage bus 15 of FIG. 1 during a start event of the engine 20. Beginning at step S102, the electrical sensor 11 determines the voltage level on the DC voltage bus 15 as the bus voltage ($V_S$), and reports the bus voltage to the controller 50. The method 100 then proceeds to step S104.

At step S104, the controller 50 compares the voltage level on the DC voltage bus 15, as captured in the measured bus voltage ($V_S$) from step S102, to the calibrated minimum voltage ($V_{CAL}$), e.g., using comparator logic stored in memory (M) of the controller 50. The controller 50 executes step S105 when the measured bus voltage ($V_S$) exceeds the calibrated minimum voltage ($V_{CAL}$). When the opposite result is detected, i.e., when $V_S > V_{CAL}$, the controller 50 instead executes step S106.

Step S105 includes passing the requested torque (arrow $T_R$) of FIG. 3 through as the torque command (arrow $T_{CC}$) and proceeds to step S108.

Step S106 entails adjusting the requested torque (arrow $T_R$) of FIG. 3 using the PI torque loop portions of the voltage stabilization logic 50L in the manner described above. The method 100 then proceeds to step S108.

At step S108, the controller 50 controls a torque operation of the starter motor 18 using the requested torque ($T_R$) or using a PI-adjusted requested torque ($T_R^*$), with either the requested torque ($T_R$) or the PI-adjusted requested torque ($T_R^*$) being the motor torque of the starter motor 18 that will ultimately be commanded to crank and start the engine 20. That is, if a determination is made at step S104 that the measured bus voltage ($V_S$) exceeds the calibrated minimum voltage ($V_{CAL}$), step S108 includes using the original requested torque ($T_R$) as the commanded starting torque provided to the engine 20 by the starter motor 18, while a contrary decision at step S104 results in use of the PI-adjusted request torque ($T_R^*$) for the same purpose.

Step S108 may therefore entail transmitting one of the two motor torque values, i.e., the requested torque ($T_R$) or the PI-adjusted request torque ($T_R^*$), to the starter motor 18 as the torque command (arrow $T_{CC}$ of FIG. 3), thereby commanding the starter motor 18 to crank and start. The torque command (arrow $T_{CC}$) has a value that limits inrush current to the starter motor 18 such that the voltage level on the DC voltage bus 15 remains above the calibrated minimum voltage ($V_{CAL}$). Pulse width modulation (PWM) or other semiconductor switching techniques may be used with the starter motor 18 and/or the PIM 16 to limit the motor torque (arrow $T_M$ of FIG. 1) in accordance with the torque command (arrow $T_{CC}$). In executing this step, the controller 50 may be configured to limit a current level on the DC voltage bus 15, e.g., to about 500 A (i.e., ±10 percent), such that the bus voltage is maintained above the calibrated minimum voltage ($V_{CAL}$).

The method 100 described above may therefore be used to help eliminate an excessively high inrush current from the DC voltage bus 15 of FIG. 1 during an engine start event using an AC brushless starter such as the starter motor 18. The controller 50, in executing the method 100 using the example voltage stabilization logic 50L of FIG. 3, is thus able to employ active voltage control of the DC voltage bus 15 so as to maintain the DC voltage bus 15 at or above the calibrated minimum voltage ($V_{CAL}$) without sacrificing performance of the starter motor 18.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed:

1. An electric starter system for use with an internal combustion engine, a direct current (DC) voltage bus, an alternating current (AC) voltage bus, and a power inverter module (PIM) electrically connected to the DC voltage bus and the AC voltage bus, the electric starter system comprising:
a polyphase/AC brushless starter motor that is electrically connected to the AC voltage bus, the starter motor being selectively connectable to the engine in response to a requested engine start event;
an electrical sensor connected to the DC voltage bus and configured to output a signal indicative of a voltage level of the DC voltage bus; and
a controller in communication with the electrical sensor and programmed with voltage stabilization logic, the voltage stabilization logic including a proportional-integral (PI) torque control loop;
wherein execution of the voltage stabilization logic in response to the requested engine start event, when the voltage level of the DC voltage bus is less than a calibrated minimum voltage, causes the controller to determine a required starting torque of the starter motor using the PI torque control loop, and further causes the controller to transmit a torque command to the starter motor to cause the starter motor to transmit the required starting torque to the engine, the required starting torque having a value that limits an inrush current to the starter motor.

2. The electric starter system of claim 1, wherein the starter motor includes a rotor and the engine includes a flywheel, the electric starter system further comprising:
a solenoid coupled to the rotor; and
a pinion gear coupled to the solenoid;
wherein the solenoid is configured to translate the pinion gear into meshed engagement with the flywheel in response to the requested engine start event.

3. The electric starter system of claim 1, wherein a maximum voltage level of the DC voltage bus is 13V, and wherein the calibrated minimum voltage is between 8V and 9V.

4. The electric starter system of claim 1, wherein the controller is further configured to limit a current level of the DC voltage bus to 500A such that the voltage level of the DC voltage bus is maintained above the calibrated minimum voltage.

5. The electric starter system of claim 1, wherein the controller is further configured to generate or command pulse width modulation of the PIM and the starter motor to achieve the required starting torque.

6. The electric starter system of claim 1, wherein the controller uses a pair of torque-speed models for the polyphase/AC brushless starter motor and a reference/hypothetical brush-type starter motor, the torque-speed models receiving a present speed of the polyphase/AC brushless starter motor and outputting a corresponding maximum torque capability for the polyphase/AC brushless starter motor and the reference/hypothetical brush-type starter motor, and a torque limiter block that limits the torque command to be between the corresponding maximum torque capacity of the polyphase/AC brushless starter motor and the reference/hypothetical brush-type starter motor.

7. A method for stabilizing voltage on a direct current (DC) voltage bus in a system having an internal combustion engine, a power inverter module (PIM) electrically connected to an alternating current (AC) voltage bus and a direct current (DC) voltage bus of a powertrain, a polyphase/AC brushless starter motor electrically connected to the PIM via the AC voltage bus and selectively coupled to the engine during a requested engine start event, and a controller programmed with voltage stabilization logic that includes a proportional-integral (PI) torque control loop, the method comprising:
responsive to the requested engine start event, determining the voltage level of the DC voltage bus using an electrical sensor;
comparing the voltage level to a calibrated minimum voltage using the controller;
responsive to the voltage level being less than the calibrated minimum voltage:
determining, using the PI torque control loop, a motor torque of the starter motor; and
transmitting the motor torque to the starter motor as a commanded starting torque to thereby crank and start the engine;
wherein the commanded starting torque has a value that limits inrush current to the starter motor.

8. The method of claim 7, the powertrain further including a transmission coupled to the engine, a drive axle coupled to the transmission, and a load coupled to the drive axle, the method further comprising: transferring torque from the engine to the load through the transmission and the drive axle.

9. The method of claim 8, wherein the load is a set of drive wheels of a motor vehicle.

10. The method of claim 9, wherein the engine includes a flywheel and the powertrain further includes a solenoid coupled to a rotor and a pinion gear coupled to the solenoid, the method further comprising: translating the pinion gear into engagement with the flywheel via the solenoid during the requested engine start event.

11. The method of claim 9, wherein a maximum voltage level of the DC voltage bus is 13V, and wherein the calibrated minimum voltage is between 8V and 9V.

12. The method of claim 9, further comprising: limiting, via the controller, a current level of the DC voltage bus to 500A such that the voltage level of the DC voltage bus is maintained above the calibrated minimum voltage.

13. The method of claim 9, further comprising: generating or commanding pulse width modulation of the PIM and the starter motor to achieve the commanded starting torque.

14. The method of claim 9, wherein the controller is programmed with a pair of torque-speed models for the polyphase/AC brushless starter motor and a reference/hypothetical brush-type starter motor, the method further comprising: receiving a present speed of the polyphase/AC brushless starter motor via the controller; and outputting a corresponding maximum torque capability for the polyphase/AC brushless starter motor and the reference/hypothetical brush-type starter motor using the torque-speed models; and limiting a torque command, via a torque limiter block of the controller, to be between the corresponding maximum torque capacity of the polyphase/AC brushless starter motor and the reference/hypothetical brush-type starter motor.

15. A powertrain comprising:
an internal combustion engine;
a transmission connected to the engine;
a direct current (DC) voltage bus;

an alternating current (AC) voltage bus;
a power inverter module (PIM) electrically connected to the AC voltage bus and the DC voltage bus;
a polyphase/AC brushless starter motor electrically connected to the PIM via the AC voltage bus, wherein the starter motor is selectively coupled to the engine in response to a requested engine start event;
an electrical sensor connected to the DC voltage bus and configured to output a signal indicative of a voltage level of the DC voltage bus; and
a controller in communication with the electrical sensor and programmed with voltage stabilization logic that includes a proportional-integral (PI) torque control loop, wherein execution of the voltage stabilization logic in response to the requested engine start event, when the voltage level of the DC voltage bus is less than a calibrated minimum voltage, causes the controller to determine a starting torque of the starter motor using the PI torque control loop, and to transmit the starting torque to the starter motor as a torque command to thereby crank and start the engine;
wherein the starting torque has a value that limits inrush current to the starter motor.

16. The powertrain of claim 15, further comprising: a drive axle coupled to the transmission, and a load coupled to the drive axle, with torque from the engine being transferred to the load through the transmission and the drive axle.

17. The powertrain of claim 16, wherein the load is a set of drive wheels of a motor vehicle.

18. The powertrain of claim 15, wherein the starter motor includes a rotor and the engine includes a flywheel, the powertrain further comprising:
a solenoid coupled to the rotor; and
a pinion gear coupled to the solenoid;
wherein the solenoid is configured to translate the pinion gear into meshed engagement with the flywheel in response to the requested engine start event.

* * * * *